3,389,162
6-BROMO-4-THIOCYANO-o-CRESOL
Martin B. Neuworth and Robert J. Laufer, Pittsburgh, Pa., assignors, by mesne assignments, to Consolidation Coal Company, a corporation of Delaware
No Drawing. Filed Oct. 18, 1965, Ser. No. 497,552
1 Claim. (Cl. 260—454)

The present invention relates to a novel compound, specifically 6-bromo-4-thiocyano-o-cresol, which we have found to be an excellent paint fungicide, useful in both latex and oil paints.

The preparation of 6-bromo-4-thiocyano-o-cresol may be illustrated by the following example. To a well-stirred mixture consisting of a solution of 748 grams of 4-thiocyano-o-cresol in 1800 milliliters of diethyl ether and 1800 milliliters of water was added 752 grams of bromine over a period of 98 minutes at 19–40° C. The ether phase was separated, washed free of acid with water and aqueous sodium bicarbonate and dried over $MgSO_4$. To the ether solution was added 250 milliliters of toluene. The ether was distilled from the solution to a final pot temperature of 80° at atmospheric pressure. The hot residual solution was diluted with 1020 milliliters of warm (70° C.) heptane and 250 milliliters of toluene, and the desired product crystallized by cooling the stirred solution slowly to 18° C. Colorless needles, with a melting point of 92.0–93.2° C. were obtained in a 95 percent yield. Analyses confirmed the composition of the compound to be 6-bromo-4-thiocyano-o-cresol.

The compound of this invention was evaluated as a paint fungicide, and its performance as such was compared with that of 6-bromo-4-thiocyano-2-t-butylphenol and of 2,6-di-isopropyl-4-thiocyanophenol. The evaluation comprised testing in vitro the inhibiting effect of the compound on the growth of the organism *Pullularia pullulans*. In addition to potency, the effect of the compounds under study on the properties of two different paint systems was determined. These properties which are usually affected are pH, viscosity, color, and odor. In order to determine response to actual commercial conditions, changes in these properties were determined by incorporating into the paint, 0.5 percent by weight of the thiocyanophenol. The latter, as used, was in the form of a dispersion in ethylene glycol, in the relative proportions of thiocyanophenol and glycol of 1 to 3. An acrylic latex top coat and an oil-based top coat were selected as the test paint systems. Property changes were determined after one week's storage at 140° F.

In summary, it was found that all three compounds tested had little or no adverse effect on the properties of either of the two paint vehicles. However, only 6-bromo-4-thiocyano-o-cresol possessed any activity as a paint fungicide. Its activity was found to be manyfold greater than that of commercially available fungicides such as 2,3,4,6-tetrachlorophenol and phenyl mercury oleate; and furthermore, in both latex and oil-based paints, in contrast to the commercially available fungicides which seldom function well in both vehicles.

According to the provisions of the patent statutes, we have explained the principle, preferred construction, and mode of operation of our invention and have illustrated and described what we now consider to represent its best embodiment. However, we desire to have it understood that, within the scope of the appended claim, the invention may be practiced otherwise than as specifically illustrated and described.

We claim:
1. 6-bromo-4-thiocyano-o-cresol.

References Cited

UNITED STATES PATENTS

| | | |
|---|---|---|
| 2,562,948 | 8/1951 | Robbins, et al. _____ 260—454 |
| 3,246,039 | 4/1966 | Reifschneider _____ 260—454 X |
| 3,274,257 | 9/1966 | Reifschneider et al. _ 260—454 X |
| 3,303,206 | 2/1967 | Reifschneider _____ 260—454 |
| 3,328,243 | 6/1967 | Wolf et al. _____ 260—454 X |

CHARLES B. PARKER, *Primary Examiner.*

D. H. TORRENCE, *Assistant Examiner.*